Nov. 1, 1960 L. DIETRICH 2,958,392
APPARATUS FOR ELECTROSTATIC PRECIPITATION
Filed May 31, 1956

INVENTOR.
LEO DIETRICH
BY
*James J. Whalen*
ATTORNEY.

United States Patent Office 2,958,392
Patented Nov. 1, 1960

2,958,392
APPARATUS FOR ELECTROSTATIC PRECIPITATION

Leo Dietrich, Frankfurt am Main, Germany, assignor to Apra Precipitator Corporation, New York, N.Y., a corporation of Delaware Filed May 31, 1956, Ser. No. 588,357

Claims priority, application Germany June 10, 1955

3 Claims. (Cl. 183—7)

The invention relates to an electrostatic precipitator subdivided into sectors (Sector-Electric Precipitator) in which the dust precipitated on collecting surfaces in the sectors on removal from the raw gas stream is transferred by a minor or purge gas stream to a mechanical separator which is also used for removal of dust from the raw gases at a location ahead of the electrostatic precipitator.

Hitherto the dust precipitated in the electrostatic precipiator from the raw gas stream was transferred by blowing to a gas stream of considerable smaller volume, however of higher dust concentration. The dust then was separated out of the minor gas stream of higher dust concentration by means of a succeeding separator.

In accordance with the invention the dust precipitated in the sectors of the electrostatic precipitator and suspended in a minor gas stream independent of the main raw gas stream is again returned to the preceding mechanical precollector. In this manner the dust contained in the raw gases is evacuated only from the mechanical separator. Surprisingly the same effect is achieved when operating in this manner as could be achieved by the use of an appended dust separator arranged after the electrostatic precipitator in the main gas stream. In this manner a saving can be secured through elimination of the succeeding precipitator as well as by saving of the space it would occupy; and the dust is evacuated at only one single location, namely in the precollector separation stage.

Figure 2:
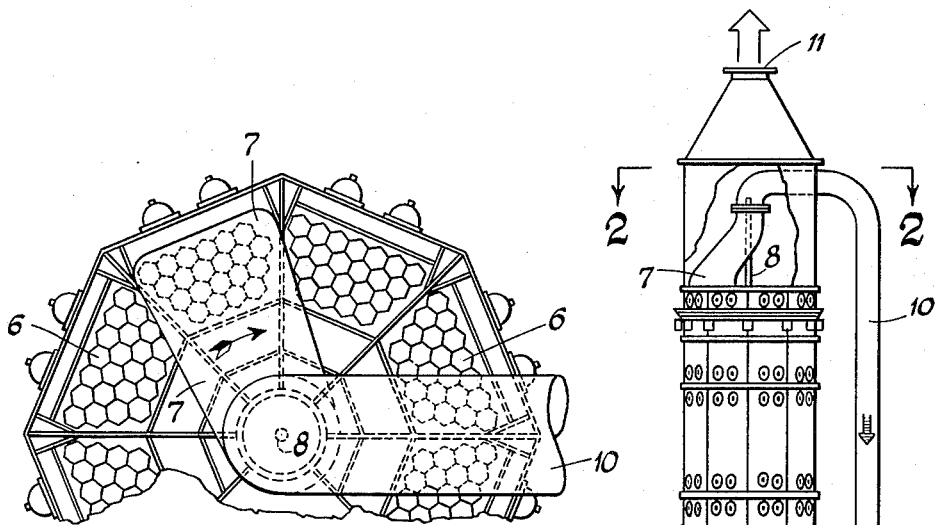
Figure 2 is a section along line II—II of Fig. 1.
Figure 1:
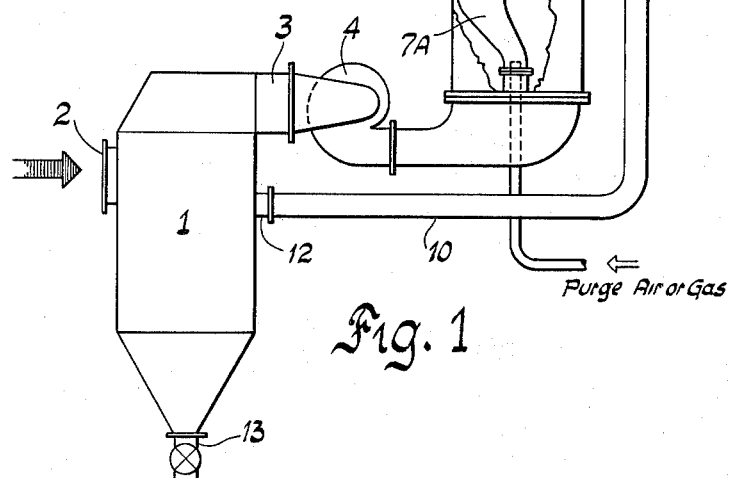
Figure 1 shows schematically a mechanical pre-separator as disposed ahead of an electrostatic precipitator.

The numeral 1 designates a mechanical pre-separator, for instance, a cyclone or multi-cyclone. The raw gases enter separator 1 through inlet 2 and the treated gases are conducted by way of conduit 3 and suction fan 4 into the lower portion of an electrostatic precipitator 5, per se known in the art as exemplified by the Karlsson Patent No. 2,582,133 dated January 8, 1952. This sectored electrostatic precipitator comprises several sectors 6 as indicated in Fig. 2, and a hood 7 rotatable above sectors 6. By means of shaft 8 hood 7 can be positioned above that single sector 6 which is to be momentarily excluded from the raw gas stream at any one time. In this manner each sector 6 thus excluded from the raw gas stream can be cleaned of the dust precipitated on the tubes or sections 9. This is accomplished by blowing of pressurized air, gas or the like into the sector thus excluded from the raw gas stream, for example, through a hood 7A operated in synchronism with the hood 7 as in the Karlsson patent and then conducting the purging air or gas away from the electrostatic precipitator by way of hood 7 and conduit 10. The clean gas leaves the electrostatic precipitator through outlet 11 at the upper end thereof.

In accordance with the invention, the dust conduit 10 is connected to inlet 12 of the precollecting dust separator 1 and carries a gas quantity in the order of $\frac{1}{5}$ to $\frac{1}{10}$ of the raw gas stream which leaves precipitator 5. Thus, the dust precipitated in the precipitator 5 is completely evacuated by way of valve 13 in the precollector stage.

To attain the object of the invention of permitting the evacuation of the dust only from the pre-separation stage, it is of advantage that the mechanical pre-separator 1 at least takes over 70% of the dust removal and that in addition it separate the dust from the recycled, dust carrying gas quantity of 10 to 20% received through duct 10, in an equally efficient manner. The pre-separator stage must therefore be designed for a capacity which is larger by the above amount, than the capacity needed in case a separation stage following the electrostatic precipitator were provided in a manner well known in the art.

How the inventive apparatus operates is further set forth by way of an example. It is assumed that the dust content of the raw gas amounts to 30 g./Nm.$^3$ at the inlet 2 of the mechanical pre-separator 1. Then the raw gas when leaving the mechanical pre-separation stage contains approximately 9 g./Nm.$^3$. In the electrostatic precipitator 5 at least 90% of the dust is precipitated so that a residue of 0.9 g./Nm.$^3$ of dust is left in the clean gas. The total precipitation amounts then to 97%.

What I claim is:

1. A system for removing particulate material from gaseous fluids comprising; a mechanical precollector for separating particulate material from a stream of gases; an outlet for discharging treated gases from said precollector; an electrostatic precipitator connected to the outlet of said precollector for receiving the treated gases therefrom; means for directing a stream of purging gas through the precipitator to remove particulate material therefrom; and means connecting the purging gas outlet to the inlet side of said precollector.

2. A gas cleaning system comprising: an electrostatic precipitator for separating particulate material from laden gases connected in series relation to a mechanical precollector for partially separating particulate material from the gases prior to their admission to said precipitator; means for directing a stream of gaseous purging fluid through said precipitator for removing particulate material therefrom; an outlet duct for said stream of purging fluid connected to the inlet side of said precollector; and means for removing from said precollector particulate material separated from the gases by both said precollector and said precipitator.

3. In an electrostatic precipitator having a plurality of electrodes and associated collecting surfaces, inlet and outlet ducts for continuously passing a column of particle laden gases over the electrodes and collecting surfaces; means for periodically segregating electrodes and collecting surfaces in successive groups from the remainder of the electrodes and collecting surfaces, each segregated group constituting a minor proportion of the electrodes and collecting surfaces in the precipitator;

means for directing a stream of gaseous purging fluid over the electrodes and collecting surfaces of said segregated group; a precollector located in advance of said precipitator in the direction of gas flow for separating part of the particulate material from the gases prior to their admission to said precipitator; and a duct connecting the purging gas outlet of said precipitator to the inlet side of said precollector.

References Cited in the file of this patent

UNITED STATES PATENTS

| | | |
|---|---|---|
| 2,701,622 | Hodson | Feb. 8, 1955 |
| 2,717,051 | Andres | Sept. 6, 1955 |

FOREIGN PATENTS

| | | |
|---|---|---|
| 914,372 | Germany | July 1, 1954 |